Nov. 26, 1968   C. A. LARSON   3,412,938
MOBILE CROP SPRAYER

Filed Sept. 6, 1966   2 Sheets-Sheet 1

INVENTOR.
CLARENCE A. LARSON
BY *Malcolm L. Moore*
ATTORNEY

Nov. 26, 1968   C. A. LARSON   3,412,938
MOBILE CROP SPRAYER
Filed Sept. 6, 1966   2 Sheets-Sheet 2

INVENTOR.
CLARENCE A. LARSON
BY
ATTORNEY

United States Patent Office 3,412,938
Patented Nov. 26, 1968

3,412,938
MOBILE CROP SPRAYER
Clarence A. Larson, 4221 Coulee Springs Lane,
La Crosse, Wis. 54601
Filed Sept. 6, 1966, Ser. No. 577,395
4 Claims. (Cl. 239—172)

ABSTRACT OF THE DISCLOSURE

An improved crop sprayer, particularly for tobacco, having a prime mover, pump means, and a liquid spray tank arranged longitudinally on the frame of a single-wheeled vehicle, with the aforesaid components being fully enclosed within a smoothly contoured sheet metal housing. The housing has a tapered front end portion terminating in a nose which brushes the tobacco leaves aside to avoid damaging them as the vehicle is propelled between narrow rows of tobacco plants.

---

This invention relates to mobile crop sprayers, and more particularly to such sprayers comprising a tank of liquid spray and spray discharge means mounted on a vehicle.

Spray apparatus of this type is conventionally employed for spraying insecticides and weed killer on crops and plants. My improved spray device is particularly adapted for use in spraying crops such as tobacco or the like for which known mobile sprayers may not be satisfactorily employed. Tobacco plants normally sprout suckers or parasitic growths on the stalks at the base of each leaf at an advanced stage of their development. These suckers must either be removed by hand, or killed by the application of a chemical spray liquid. A liquid spray known as "MH–30," which is a diethanolamine salt of maleic hydrazide manufactured by the Chemical Division of United States Rubber Company, is particularly well suited for this purpose. However, there is presently not available a relatively small and inexpensive mobile crop sprayer suitable for applying this material to tobacco crops. The problem arises from the fact that tobacco plants are planted in closely spaced rows, often only 27 inches apart, and at the time when the spray should be applied, the plants have normally become so large that the leaves overhang the space between rows, with the leaves from adjacent plants overlapping each other, thus making it impossible to propel the available two or four-wheeled spray vehicles through the tobacco fields without damaging the leaves. Since the price obtained for tobacco is largely determined by the condition of the leaf, tobacco farmers have consequently either removed the suckers by hand or they have sprayed their crops with small manually operated spray tanks carried on their backs. Either method is obviously a time consuming task, adding substantially to the time and cost of bringing the tobacco crop to market.

With the aforesaid problems in mind, I have developed a mobile sprayer of such a design that it may be propelled through tobacco fields without injuring the leaves of the tobacco plants. My improved crop sprayer is particularly characterized by the arrangement of an engine, compressor and spray tank longitudinally on a single-wheeled vehicle, so as to provide a long, narrow mobile sprayer, which is fully enclosed within a smoothly contoured sheet metal housing.

An especially significant feature of my invention resides in the shaping of the aforesaid sheet metal housing so as to provide a downwardly inclined and tapered front end portion terminating in a nose or "knee" which brushes the tobacco leaves aside with a minimum of disturbance as the spray device is moved forward between the narrow rows of plants.

An additional feature of my mobile sprayer is the arrangement of the component parts forwardly of the support vehicle, with the liquid spray tank located directly over the axle of the front wheel. By thus distributing the weight as far towards the front of the mobile sprayer as possible, the vehicle is easire to hold, and push through the fields.

Another feature of my invention is the provision of a plurality of spray nozzles mounted on a boom with valves therebetween, whereby the operator may select the number of rows of plants to be sprayed by closing one or more valves and thus rendering some of the nozzles inoperative.

These and other features and advantages of my invention will become readily apparent as the following description is read in conjunction with the accompanying drawings, of which:

Figure 3:
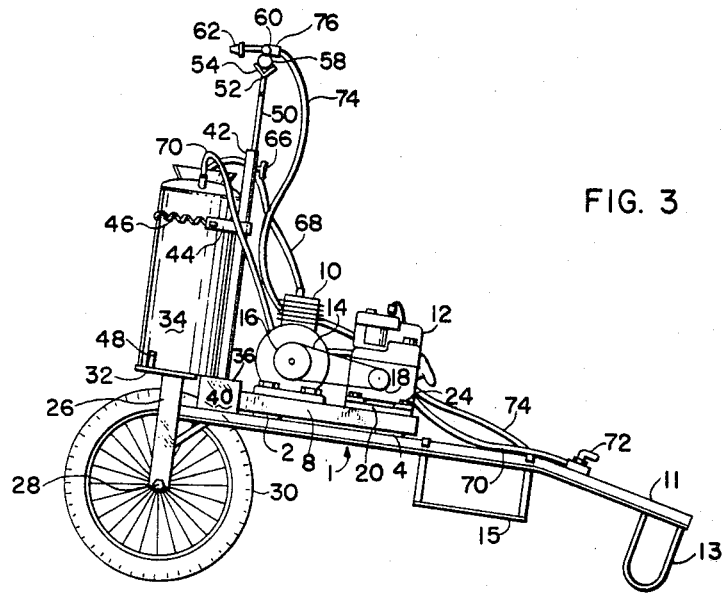
FIGURE 3 is a front elevation view of my mobile sprayer shown with the housing removed.
Figure 4:
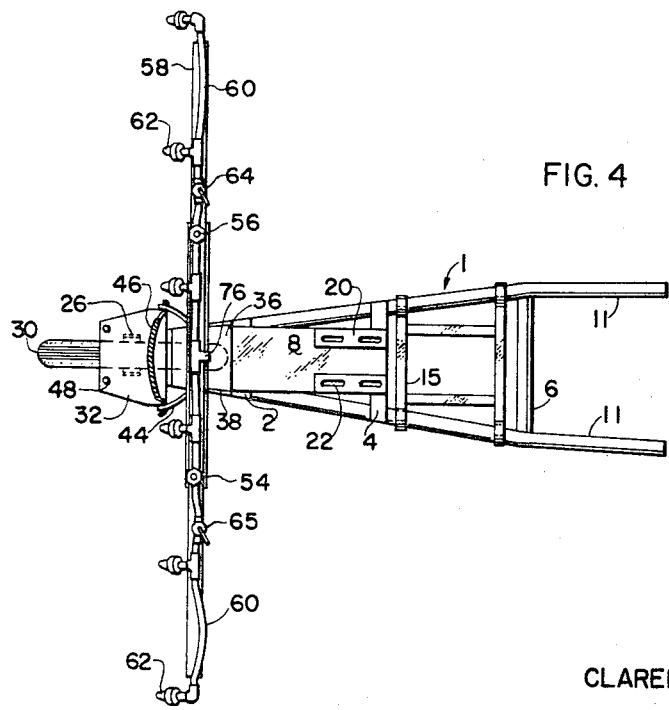
FIGURE 4 is a top view showing the sprayer frame with the liquid spray tank, compressor and engine removed.

With reference to FIGURES 3 and 4, the mobile crop sprayer of this invention is comprised of a long, narrow "A" frame 1 having reinforcing cross members 2, 4 and 6 secured thereto. A base platform 8 welded to cross pieces 2 and 4 serves to support an air compressor 10 and an engine 12. Compressor 10 is driven by belt 14 which passes around pulley wheels 16 and 18 mounted on compressor 10 and engine 12 respectively. Engine 12 is mounted on runners 20 having slots 22 therein through which bolts 24 are fastened. The tension of belt 14 may be adjusted by loosening bolts 24 and sliding engine 12 back and forth to the position desired. Welded to the front of frame 1 are a pair of vertically extending trunnions 26 which support a front axle 28 upon which a wheel 30 is mounted. Secured across the top of trunnions 26 is a generally horizontally extending plate 32 which serves to support a tank 34 of liquid chemical spray. The front portion of tank 34 rests upon plate 32 and the rear thereof is supported upon the tapered top face 36 of member 38, which has vertical side walls 40 welded to the top of the opposed side arms of frame 1. Vertical bar 42 extends upwardly from top face 36 of member 38, and has an arcuately shaped saddle piece 44 rigidly fastened thereto, as by welding or otherwise. Liquid spray tank 34 is cradled within saddle piece 44 and is retained in place by means of spring belt 46 which is hooked at either end thereof in holes provided in saddle piece 44. Pins 48 extending upwardly from plate 32 assist in preventing lateral movement of tank 34.

Figure 1:
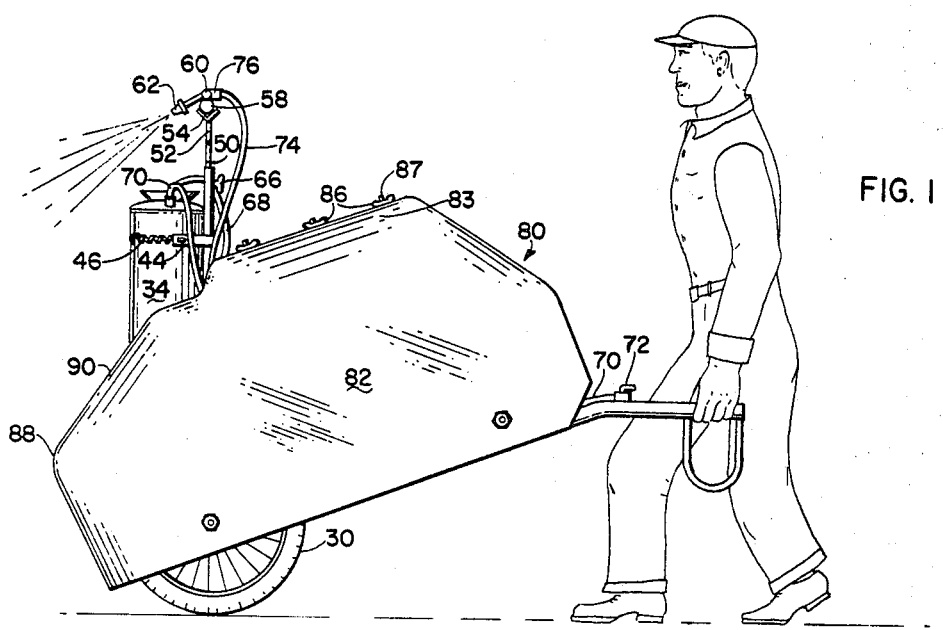
FIGURE 1 is a front elevation view of my mobile sprayer showing it in the position it would be in when being moved through a tobacco field.

By mounting spray tank 34 over front wheel axle 28 in the manner shown, the weight of the liquid-filled spray tank is transmitted to wheel 30, rather than to "A" frame 1, thus making the frame 1 easier to lift into the operative position shown in FIGURE 1. The location of compressor 10 and engine 12 generally forwardly of frame 1 also provides a weight moment acting towards the front of the vehicle, which makes it easier to push the mobile spray apparatus through the fields. Moreover, the arrangement of tank 34, compressor 10 and engine 12 longitudinally along frame 1 permits the width of the mobile sprayer to be maintained at a minimum, which significantly contributes to the ease with which the spray vehicle may be maneuvered between narrow rows of tobacco plants without damaging them.

Slidably positioned within hollow bar 42 is a rod 50. An angle iron 54 is welded to the top of rod 50 and is supported thereon by means of braces 52. Resting upon angle iron 54, and fastened thereto by means of bolts 56 is a laterally extending boom 58, which serves as a support for a liquid conducting tube 60. This arrangement of parts may be more clearly seen in FIGURE 2. A plurality of forwardly extending spray nozzles 62 are connected to tube 60 at spaced intervals. The length of boom 58 and tube 60 may be varied to support any number of spray nozzles 62 desired, depending upon the number of rows of tobacco which one wishes to spray in one pass with my mobile sprayer. I have shown six nozzles as an illustrative example. Even with the number of nozzles fixed, the operator may still vary the number of rows of plants to be sprayed at one time by manipulating hand valves 64 and 65. Thus when both valves 64 and 65 are open, all six nozzles will be effective to dispense liquid spray. By closing valve 64, the distribution of liquid spray to the two nozzles on the extreme left end (viewed from the front with reference to FIGURE 2) of boom 58 may be shut off, thus leaving only four nozzles operative; and when both valves 64 and 65 are closed, liquid will be dispensed only through the two middle nozzles.

Set screw 66 extending through vertical bar 42 permits the adjustment of rod 50 to the desired height commensurate with the stage of growth of the plants to be sprayed.

With particular reference to FIGURE 3, the air discharge port of compressor 10 is connected to a fitting on the top of spray tank 34 by means of flexible conduit or hose 68. A liquid outlet fitting on tank 34 is connected by hose 70 to a hand valve 72 mounted on one of the rearwardly extending handle portions 11 of frame 1. Hose 74 runs from the outlet of valve 72 to a point of connection with T-fitting 76 fastened to liquid distribution tube 60.

As will be clearly understandable to those skilled in the art, the operation of compressor 10 by starting engine 12 will cause a stream of compressed air to be directed into the top of tank 34 through hose 68. This will force liquid spray out of tank 34 through hose 70 and valve 72 to hose 74 leading to liquid distribtuion tube 60. Depending upon the setting of hand valves 64 and 65, liquid will be discharged outwardly through some or all of nozzles 62 as the spray vehicle is propelled through a field of plants. The provision of hand valve 72 on one of the handle extensions 11 permits the operator to conveniently regulate the flow of liquid to nozzles 62. For example, it might be desirable to shut off the flow of liquid spray when turning the machine around at the end of a row.

Referring again to FIGURES 3 and 4, U-shaped rest hoops 13 are provided at the outer end of handle extensions 11 in order to support the spray vehicle in the position shown in FIGURE 3 when it is not being used. My mobile sprayer is also equipped with a wire strap basket 15 hung across the opposed side arms of frame 1 in the manner shown. Reserve plastic bottles of liquid spray may be carried in basket 15 if desired so as to permit the complete spraying of a row after the liquid supply in tank 34 is exhausted.

Figure 2:
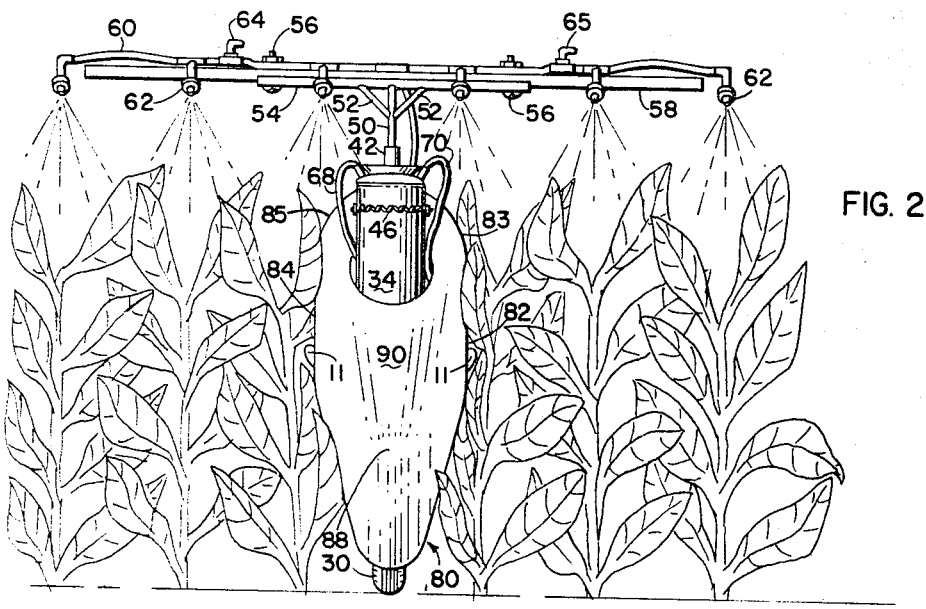
FIGURE 2 is a front view of the sprayer of FIGURE 1.

Of utmost importance to the successful operation of my mobile sprayer in tobacco fields is the sheet metal housing 80 shown in place in FIGURES 1 and 2. Housing 80 is of unitary construction comprising side walls 82 and 84 having top cover extension portions 83 and 85, which are fastened together over the top of the vehicle by wing nuts 86 screwed on to bolts 87 or by other suitable means. By virtue of this arrangement, all of the moving parts including compressor 10, engine 12, pulley wheels 16 and 18, etc., as well as other components upon which tobacco leaves might be snagged and damaged, are completely enclosed within housing 80. Housing 80, and especially top extension portions 83 and 85 thereof, also serves to prevent the corrosive liquid spray fluid from being sucked into the air intake of engine 12 and compressor 10 and fouling up the internal parts thereof.

As may best be seen in FIGURE 2, side walls 82 and 84 converge towards the front of housing 80 over wheel 30. This provides a tapered front portion on housing 80 which is snugly fitted over similarly tapered plate 32 (FIGURE 4). The top 86 of the front of housing 80 is inclined downwardly and forwardly, and terminates in a rounded nose 88. When the mobile sprayer is grasped by the operator and the front end thereof is tipped downwardly in the position of normal use, nose 88 will be the most forwardly disposed element of the spray apparatus, as is most clearly shown in FIGURE 1. Nose 88 will also be quite close to the ground at this time. Thus as the spray vehicle is pushed forward in the tilted position shown in FIGURES 1 and 2, the overhanging tobacco leaves will first be gently parted by nose 88 and then completely brushed aside by the advancing tapered front portion of housing 80. Since tobacco plants will normally have attained considerable height and size at the time best suited to the application of anti-sucker chemicals, the ability of the mobile sprayer to separate large overhanging leaves without injuring them is of considerable importance. It is to be noted that when the mobile sprayer is being propelled through a field, spray nozzles 62 will be angled downwardly in the position shown in FIGURES 1 and 2, thus discharging liquid chemical directly onto the tobacco plants.

Those familiar with tobaco farming will appreciate from the foregoing description that I have provided a spray machine that is uniquely adapted to cope with the problems associated with spraying tobacco plants. My mobile sprayer is narrow enough to fit between closely spaced rows of plants, and the smoothly contoured sheet metal housing 80 operates to separate tobacco leaves without damaging them. The particular arrangement of the spray tank, compressor and engine forwardly of the vehicle frame contributes to the construction of a mobile sprayer which is easy to push and manipulate in a tobacco field. My mobile sprayer thus permits the tobacco farmer, especially the farmer of relatively small acreages, to effectively suppress sucker growth in a manner not heretofore possible. The advantages of preventing the growth of suckers are well known. By letting all of the plant nutrients go into the tobacco leaves alone, the yield per acre can be increased by as much as 300 pounds. In the past this could be accomplished only by spraying manually with tanks carried through the fields in order to avoid damage to tobacco leaves which would be caused by trying to propel the available large, bulky spray machinery through the tobacco fields. It also has been demonstrated that over thirty man-hours per acre can be saved by spraying for sucker control as opposed to suckering by hand. Furthermore, the plant leaves are unavoidably damaged to a certain extent in the course of removing suckers by hand. The savings in time and labor costs are of course much more considerable when my mobile sprayer, capable of spraying several rows at a time, is employed.

While I have shown my mobile sprayer as being adapted to be pushed through a field, it could readily be modified for self-propelled operation. The most convenient arrangement would be to utilize engine 12 to drive the vehicle axle. It is also possible that a wheel arrangement different from the single wheel design shown could be employed even with a manually propelled sprayer. For example, two closely spaced wheels could be mounted on axle 28 in order to better absorb the shocks encountered when directing the mobile sprayer over rough terrain.

These and other modifications will readily occur to those skilled in the art. Thus, I do not desire to limit my invention to the particular embodiment shown and described, which is illustrative only. It is contemplated that changes may be made without departing from the spirit and scope of my invention as defined by the following claims.

I claim:

1. A mobile sprayer comprising: an elongated frame supported on a single wheel mounted on an axle; a liquid spray containing tank; pump means for discharging liquid from said tank; and a prime mover drivingly connected to said pump means; said tank, pump means and prime mover being mounted on said frame member in longitudinally spaced alignment one behind the other; liquid spray nozzle means supported from said frame; fluid conduit means connecting said tank to said nozzle means; and a smoothly contoured housing fully enclosing said pump means and said prime mover, said housing having side walls which angle inwardly towards the front thereof so as to form a tapered front portion.

2. A mobile sprayer as defined in claim 1 wherein said axle is disposed forwardly of said frame, and further including means supporting said tank substantially directly over said axle.

3. A mobile sprayer as defined in claim 1 wherein the top of said front portion is inclined downwardly and forwardly, terminating in a nose portion which is the most forwardly disposed element of said housing when said mobile sprayer is in the position of normal use.

4. A mobile sprayer as defined in claim 2 wherein said means supporting said tank comprises a generally horizontally disposed plate having tapered sides which angle inwardly towards the front of said mobile sprayer, and wherein said housing side walls are contoured to fit snugly against said tapered sides of said plate.

References Cited

UNITED STATES PATENTS

| | | | |
|---|---|---|---|
| 1,984,851 | 12/1934 | Vinz | 239—172 X |
| 2,098,523 | 11/1937 | Simning | 239—159 |
| 2,518,771 | 8/1950 | Goz | 239—172 X |
| 2,596,473 | 5/1952 | Essick | 239—172 |
| 3,040,594 | 6/1962 | Bagshaw | 239—150 X |
| 2,822,216 | 2/1958 | Finley et al. | 47—1.7 |
| 3,153,509 | 10/1964 | Curtis | 239—172 |

FOREIGN PATENTS 709,759 6/1954 Great Britain.

WALTER SOBIN, *Primary Examiner.*